(12) United States Patent
Prasad

(10) Patent No.: US 12,512,962 B2
(45) Date of Patent: Dec. 30, 2025

(54) COMPUTER-IMPLEMENTED METHOD FOR PROVIDING AN ENCRYPTED DATASET PROVIDING A GLOBAL TRAINED FUNCTION, COMPUTER-IMPLEMENTED METHOD FOR RECOVERING PERSONAL INFORMATION, COMPUTER SYSTEM AND COMPUTER PROGRAM

(71) Applicant: Siemens Healthineers AG, Forchheim (DE)

(72) Inventor: Srikrishna Prasad, Erlangen (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 125 days.

(21) Appl. No.: 18/474,883

(22) Filed: Sep. 26, 2023

(65) Prior Publication Data

US 2024/0106627 A1    Mar. 28, 2024

(30) Foreign Application Priority Data

Sep. 27, 2022    (EP) .................................... 22198103

(51) Int. Cl.
*H04L 9/00*    (2022.01)
*G06N 3/0464*    (2023.01)
(Continued)

(52) U.S. Cl.
CPC ........... *H04L 9/008* (2013.01); *G06N 3/0464* (2023.01); *G06N 3/084* (2013.01); *H04L 9/088* (2013.01); *H04L 9/08* (2013.01)

(58) Field of Classification Search
CPC ...... G06N 3/484; G06N 3/0464; G06N 3/084; G06N 3/08; G06N 20/00; G06N 20/20; H04L 9/08; H04L 9/008; H04L 9/088
See application file for complete search history.

(56) References Cited

U.S. PATENT DOCUMENTS 11,844,145 B2 * 12/2023 Elshafie ................ H04W 24/02
2018/0089590 A1    3/2018 Suresh et al.
(Continued)

FOREIGN PATENT DOCUMENTS

| EP | 3968591 A1 | 3/2022 | |
| GB | 2556981 A | 6/2018 | |
| WO | WO-2022042848 A1 * | 3/2022 | ......... G06F 21/6245 |

OTHER PUBLICATIONS

"Learn Locally, Correct Globally: A Distributed Algorithm for Training Graph Neural Networks"—Ramezani et al, ARXIV, Cornell University, Computer Science, Machine Learning, Mar. 13, 2022 https://arxiv.org/abs/2111.08202 (Year: 2022).*

(Continued)

*Primary Examiner* — Randy A Scott
(74) *Attorney, Agent, or Firm* — Harness, Dickey & Pierce, P.L.C.

(57) ABSTRACT

Respective local parameters parametrizing a base function are determined to provide at least one local trained function for each of multiple client systems by training the respective local trained function using machine learning with multiple training datasets on the respective client system, wherein at least some of the training datasets are specific to the respective client system. A respective local plaintext dataset including the local parameters of the respective local trained function is encrypted to generate a respective local encrypted dataset on the respective client system. The local encrypted datasets are transmitted to an aggregating system, and the global encrypted dataset is calculated from the local encrypted datasets using the calculation algorithm.

22 Claims, 6 Drawing Sheets

(51) Int. Cl.
  *G06N 3/084* (2023.01)
  *H04L 9/08* (2006.01)

(56) References Cited

U.S. PATENT DOCUMENTS

| | | | |
|---|---|---|---|
| 2020/0202243 A1 | 6/2020 | Guttmann | |
| 2020/0358599 A1 | 11/2020 | Baracaldo Angel et al. | |
| 2021/0248268 A1* | 8/2021 | Ardhanari | G06F 21/53 |
| 2021/0398017 A1* | 12/2021 | Garg | H04L 9/50 |
| 2021/0409190 A1 | 12/2021 | Prasad et al. | |
| 2022/0101964 A1 | 3/2022 | Prasad et al. | |

OTHER PUBLICATIONS

"Securing a Local Training Dataset Size in Federated Learning"—Shin et al., IEEE Xplore, Pinpoint, Aug. 20, 2022 https://ieeexplore.ieee.org/stamp/stamp.jsp?tp=&arnumber=9905592 (Year: 2022).*

"Framework for the Use of Digital Health Technologies in Drug and Biological Product Development" U.S. Food & Drug Administration, in: https://www.fda.gov/media/166396/download [abgerufen am Jun. 9, 2023].

* cited by examiner

COMPUTER-IMPLEMENTED METHOD FOR PROVIDING AN ENCRYPTED DATASET PROVIDING A GLOBAL TRAINED FUNCTION, COMPUTER-IMPLEMENTED METHOD FOR RECOVERING PERSONAL INFORMATION, COMPUTER SYSTEM AND COMPUTER PROGRAM

CROSS-REFERENCE TO RELATED APPLICATION(S)

The present application claims priority under 35 U.S.C. § 119 to European Patent Application No. 22198103.8, filed Sep. 27, 2022, the entire contents of which are incorporated herein by reference.

FIELD

One or more example embodiments of the present invention concern a computer-implemented method for providing a global encrypted dataset that can be decrypted using a given decryption key to provide global parameters parametrizing a base function to provide a global trained function trained by machine learning. Additionally, one or more example embodiments of the present concern a computer-implemented method for recovering personal information for a person associated with the training dataset used to train a trained function, a computer system and a computer program.

BACKGROUND

In machine learning, a function is trained in most cases by using multiple training datasets. In many cases, especially when training a function for medical image processing or in general for other medical data processing purposes, the training datasets and metadata associated with these training datasets can concern highly sensitive personal data. It is therefore highly relevant that access to the training data is limited and that any intermediate or final result of the training that might be accessible for a larger group of people does not allow a deduction of sensitive personal information.

The simplest approach to achieve this goal is a complete training of the function in a controlled environment, e.g. in the closed network of a single hospital. If data is to be transferred outside such a controlled environment, specific contracts can be made and measures can be taken to ensure the protection of personal data. This approach will however limit the scope of the usable data. In many cases it is desirable to use training data from diverse population, e.g., from multiple hospitals across the world.

A possible approach to allow more training data to be used is the use of pseudonymized data, wherein personal and/or sensitive information is removed prior to sharing the data for training purposes. The documents US 2022/0101964 A1 and EP 3 968 591 A1 both discuss approaches for providing only pseudonymized data for certain use cases. For the purpose of auditing the trained algorithm, a reidentification of the persons for which the respective training data was acquired is possible by authorized personal.

The use of pseudonymized or anonymized data for training purposes does however have two important limitations. On the one hand a complete removal of personal data form the train data is often not possible or at least very complex, especially when medical image data is to be used for training. On the other hand, a removal of personal information from the training data can limit the training. For some training purposes it might, e.g., be relevant to know the age group or the gender of a depicted patient.

The document US 2021/0409190 A1 discloses an approach for machine learning, that avoids these issues by using homomorphic encryption on the training data, which allows to perform the training itself using encrypted data. The trained model can then be decrypted. Performing the complete training on homomorphically encrypted data does however limit the useable algorithms, especially with regards to non-linearities, and can noticeably increase the processing costs for the training.

A common approach to avoid sharing sensitive data outside of closed networks of, e.g., a hospital, while still using data from multiple sources for the training is the so-called federated learning. In this approach local training is performed separately in different client systems, e.g., in different hospitals to provide a respective locally trained model. The locally trained models are then merged into a global model. Such a training can be performed in multiple rounds, where the global model is then shared again to the different client systems and further refined by local training.

Federated learning does however still have some potential issues, since it might still be possible to deduce sensitive information from the locally trained models, especially when small minibatches are used and/or when the training data used in a certain client system is highly specific. The use of federated learning typically also requires a specific protection of the transmitted locally trained models, since those can be relevant business secrets. A further problem of federated learning is that auditing a trained function, e.g. requesting certain metadata like the age distribution of the persons from whom training datasets where used, is highly elaborate, since such data needs to be locally stored and manually aggregated.

SUMMARY

One or more example embodiments of the present invention are based on at least the problem of providing a trained function using potentially sensitive training datasets from multiple client systems while avoiding or at least reducing the previously discussed problems.

At least this problem is solved by the initially discussed computer-implemented method for providing a global encryption dataset, comprising the following steps:

Determining respective local parameters parametrizing the base function to provide at least one local trained function for each one of multiple client systems by training the respective local trained function using machine learning with multiple training datasets on the respective client system, wherein at least some of the used training datasets are specific to the respective client system, Encrypting a respective local plaintext dataset comprising the local parameters of the respective local trained function to generate a respective local encrypted dataset on the respective client system, using an encryption key that allows for a decryption of the respective local encrypted dataset using the decryption key and an encryption algorithm that is homomorphic with respect to a given calculation algorithm, Transmitting the local encrypted datasets to an aggregating system, and Calculating the global encrypted dataset on the aggregating system from the local encrypted datasets using the calculation algorithm.

One or more example embodiments of the present invention are based on the idea of combining the advantages of federated learning and of data processing use homomorphic encryption in such a way, that the drawbacks of those approaches discussed above are essentially eliminated. By limiting the operations performed on the locally encrypted dataset and therefore operations performed on data that is homomorphically encrypted to the combination of local encrypted datasets to form the global encrypted dataset, the computational overhead for the encryption can be kept very low.

As discussed later, such a combination of local encrypted datasets can, e.g., be achieved by calculating a sum or a weighted sum of vectors described by the respective local encrypted dataset, which reduces the requirement placed on the homomorphic encryption and allows for a very CPU efficient homomorphic encryption, e.g., by a matrix multiplication as discussed below.

At the same time the training of the local trained function is not limited in any way, since this training is performed in a protected environment and does therefore not require any encryption.

Additionally, the discussed approach does allow for a very robust protection of personal information. This is especially true, when the decryption key is not known to the party running the aggregating system and when the local encrypted datasets are not provided to the holder of the decryption key. In this case the operator of the aggregating system does not have access to the local or global parameters, since all data used on the aggregating system is encrypted. On the other hand, the holder of the decryption key can be provided only with the global encrypted dataset or, when multiple rounds of training are used as discussed below, with the final global encrypted dataset. While the key owner can decrypt the global encrypted dataset and therefore has access to the global parameters and therefore to the global trained function, these parameters and this trained function is based on a rather large number of training datasets and does therefore not allow for any deduction of personal information.

In general, a trained function mimics cognitive functions that humans associate with other human minds. In particular, by training based on training data the trained function is able to adapt to new circumstances and to detect and extrapolate patterns.

In general, parameters of a trained function can be adapted via training. In particular, supervised training, semi-supervised training, unsupervised training, reinforcement learning and/or active learning can be used. Furthermore, representation learning (an alternative term is "feature learning") can be used. In particular, the parameters of the trained functions can be adapted iteratively by several steps of training.

In particular, a trained function can comprise a neural network, a support vector machine, a decision tree and/or a Bayesian network, and/or the trained function can be based on k-means clustering, Q-learning, genetic algorithms and/or association rules. In particular, a neural network can be a deep neural network, a convolutional neural network (CNN) or a convolutional deep neural network. Furthermore, a neural network can be an adversarial network, a deep adversarial network and/or a generative adversarial network (GAN).

The training dataset can comprise measurement data and/or image data that concerns a person associated with that training dataset and that is used in the training of the respective local trained function, wherein the respective local plaintext dataset comprises personal information concerning the persons associated with the training datasets used to train the respective local trained function on the respective client system. In this case the personal data is encrypted as part of the respective local encrypted dataset. It is therefore possible, e.g., for the purpose of an audit, to recover this personal information by providing the decryption key and the local encrypted dataset to the same party, e.g. to a representative of the hospital that originally provided the local encrypted dataset.

The local encrypted dataset can be stored for this purpose in the respective client system. It is however also possible to store the local encrypted dataset in the aggregating system as a backup, in case data is lost in the original client system. To further improve the protection of personal information, either for all personal information or for especially sensitive personal information, e.g. medical health data, pseudonymization can be used and the original personal information can e.g. only be stored in a reidentification data base in the client system. The personal information recovered by the decryption of the local encrypted dataset can in this case, e.g., only allow the identification of the correct reidentification information.

As previously discussed, the personal information for a single training dataset cannot typically not be recovered from the global encrypted dataset, therefore leading to a strong protection of personal information. It is however possible to store personal information in such a way in the local plaintext dataset, that statistical information concerning the properties of the persons for which training datasets were considered, can be recovered from the global encrypted dataset. It is e.g. possible to store the number of persons in a specific age group for multiple age groups as a data item, e.g. as a vector entry, in the local plaintext dataset. When a weighted sum is used to calculate the global encrypted dataset from the local encrypted datasets and the respective weight for the local encrypted dataset is proportional to the number of training datasets used to generate this local encrypted dataset, the overall number of persons in a certain age group or the fraction of persons within a respective age group can be recovered by decrypting the encrypted global dataset.

Therefore, depending on the way that personal data is included in the local plaintext dataset, the holder of the decryption key, e.g. the sponsor of the training of the trained function, can be provided with relevant statistics concerning the used training data, which can be relevant for audits or for detecting a potential bias in the training data.

The personal information can comprise at least one identifying information for each training dataset, that by itself or in conjunction with a separately stored reidentification information allows for an identification of the person associated with the respective training dataset. Preferably, the identifying information is stored in such a way that it cannot be recovered from the global encrypted dataset, which is typically the case as discussed above. In this case, access to the decryption key and to the individual local encrypted dataset is necessary to recover the identifying information, which in some use case is sufficient to protect the identifying information.

A direct identification of the person associated with the respective training dataset is, e.g., possible, when a name of the person, the birth date and/or a phone number are stored.

As discussed in more detail later, it is however preferable, to require the additional use of a reidentification information. This can, e.g., be achieved by using well-known pseudonymization algorithms, that can, e.g., be based on a cryptographic hash-function.

It is however also possible, to use relatively simple pseudonymization approaches. E.g., a patient ID or an ID for an examination device, a lab, etc. and a date and time of acquisition of the training dataset can be stored. In both cases hospital records can be used to reidentify the patient. A reidentification of the specific person might be useful, especially when certain personal information concerning the person is required in an audit and was not explicitly considered during the training process.

Additionally or alternatively, the personal information can comprise at least one property information for each training dataset, wherein the respective property information concerns a property of the person associated with the training dataset. Such a property can e.g. be the age and/or the weight of the person. Preferably, the property information by itself does not allow for a reidentification of the person. Directly storing such a property as personal information can be advantageous, since such a property information can be sufficient to meet the requirements of an audit without requiring the identification of the person whom the training dataset concerns. Since the personal information by itself does not allow a reidentification of the person, in many used cases the encryption of the local encrypted datasets will be sufficient for the protection of this data.

The personal information can comprise at least one statistical information concerning the number of persons having a respective given property associated with the training datasets used to train the respective local trained function on the respective client system. As already discussed, this approach can provide useful information concerning the frequency and/or distribution of certain properties in the considered persons, while at the same time allowing for a high degree of protection for personal data of the individual person, especially when only the global encrypted dataset is decoded and therefore the recovered distribution of frequencies of properties are only disclosed for a large group.

The determination of the global encrypted dataset can be repeated for multiple rounds of machine learning, wherein all rounds except for the first round additionally comprise:
  Transmitting the global encrypted dataset calculated by the aggregating system in the previous round to the client systems,
  Decrypting the received global encrypted dataset by the respective client system to determine the global parameters for the previous round, and
  using these global parameters as initial local parameters during the training of the local trained functions.

In each round a separate subset of training datasets available in the respective client system can be used. It is however also possible to reuse training datasets used in a first round of training in a later round of a training, e.g., in the next epoch of training. In the initial round of training, the local trained function can be initialized by setting the initial local parameters to given values. These initial values can be given while setting up the local training on the respective client system. It is however also possible to provide an initial global encrypted dataset, comprising encrypted initial parameters for the first round and to distribute this global encrypted dataset to the client systems in the same way that the global encrypted dataset is provided for the following rounds.

Each round of training on each respective client system can in the simplest case only comprise a single adjustment of the local parameters. It is, e.g., possible, to calculate a loss function, especially a gradient of the loss function, for the subset of training datasets used on the respective client system and to use this loss function or gradient to update the local parameters. Preferably, multiple sub-rounds of training are performed on the client system to perform multiple updates of the local parameters before generating an encrypted local dataset and providing that dataset to the aggregating system.

The personal information included in the plaintext dataset in each round can comprise only personal information for the training datasets used during this round. In this case it can be necessary to access the local encrypted datasets for all rounds to recover all relevant personal information. Alternatively, it is however possible to include personal information for the training datasets used during the current and during all previous rounds in the plaintext dataset encrypted for the current round. In this case it is sufficient to provide the most recent local encrypted dataset to recover all relevant personal information for this client system.

The local encrypted datasets can each comprise an ordered sequence of data elements, wherein for each position in this sequence, a sum or a weighted sum of the data elements of the local encrypted datasets having that position can be calculated in the calculation algorithm. The respective sum or weighted sum can then, e.g., be directly used as the data element at the same position of the global encrypted dataset.

The respective local encrypted dataset can especially be considered as a vector or a rectangular matrix. The global encrypted dataset can then be calculated by using a vector or matrix addition or by first performing as scalar multiplication of the respective vector or matrix with a weighting factor and then adding the scaled vectors or matrices.

Therefore, any encryption algorithm that is homomorphic with respect to the addition of vectors or rectangular matrices can be used, wherein preferably an encryption algorithm that is also homomorphic with respect to a scalar multiplication of vectors or rectangular matrices is used, since this allows an introduction of weighting factors when calculating the global encrypted dataset and therefore the global parameters. An advantageous algorithm is, e.g., given in the previously cited document US 2021/0409190 A1. While this document is referred to concerning the details of this encryption algorithm, the following will give brief overview over its core features and properties concerning the present invention.

As discussed above, the respective local plaintext dataset P can be considered to be a vector or in more general terms a m×n rectangular matrix. Using two invertible matrices A and B, encryption can be performed using the formula:

$$C = A \cdot P \cdot B^{-1} \quad (1)$$

The local encrypted dataset C can therefore be calculated by performing a matrix multiplication of the quadratic m×m matrix A, the local plaintext dataset P and the inverse of the quadratic n×n matrix B. The matrices A and B−1 therefore from the encryption key.

Decryption can then be performed by using a matrix multiplication of the inverse of the matrix A, the local encrypted dataset C and the matrix B:

$$A^{-1} \cdot C \cdot B = A^{-1} \cdot A \cdot P \cdot B^{-1} B = P \quad (2)$$

The decryption key is therefore given by the matrices A−1 and B. When calculating a weighted sum of multiple local encrypted datasets C1 and C2 with the weighting factors x, y, the described encryption algorithm is homomorphic with respect to this operation:

$$A^{-1} \cdot (x \cdot C1 + y \cdot C2) \cdot B = x \cdot A^{-1} \cdot A \cdot P1 \cdot B^{-1} \cdot B + y \cdot A^{-1} \cdot A \cdot P2 \cdot B^{-1} \cdot B = x \cdot P1 + y \cdot P2 \quad (3)$$

Decrypting the global encrypted dataset therefore yields the weighted sum of the plaintext datasets P1, P2. The calculation of the global encrypted dataset from the multiple local encrypted datasets can therefore be performed without knowledge of the encryption key. The global parameters can then be recovered from the global encrypted dataset using the decryption key.

To reduce the processing requirements used for this algorithm, it can be advantageous to use involuntary matrices A and B for encrypting and decrypting. As discussed in more detail in the previously cited document US 2021/0409190 A1, such matrices can be generated by first generating a random integer matrix, then determining an unimodular integer matrix in such a way that the matrix product of the unimodular integer matrix and the random integer matrix equals a hermite normal form of the random integer matrix, and then providing the respective matrix used for encryption by calculating a matrix product of the unimodular integer matrix, an exchange matrix and the inverse of the unimodular integer matrix.

At least one of the client systems can comprise multiple data sources and a communication unit, wherein the communication unit receives a request message comprising a selection criterium for selecting the training data sets for training the at least one local trained function, wherein the communication unit forwards the selection criterium to the data sources, wherein the data sources select datasets matching the selection criterium as training datasets and forward the respective selected training datasets to the communication unit. Communication between different units within the client system can be protected. E.g., all units in the client system can be on a closed network that can be a local network or a virtual private network. Communication with the aggregating system can in principle be performed via an open network, e.g., the internet, since only encrypted data is transmitted.

It is however also possible, to use encryption protocols to secure the communication between the client system and the aggregating system.

The client system can comprise multiple calculating units, wherein the communication unit forwards the training datasets or a respective subgroup of the training datasets provided by the data sources to the calculating units, wherein the respective calculating unit performs a training of the respective local trained function based on the transmitted training datasets. A respective local encrypted dataset can be provided by the individual calculating units and the local encrypted datasets can then be forwarded by the communication unit to the aggregating system. Alternatively, the communication unit can also aggregate local parameters determined by the multiple calculating units, e.g., calculate a weighted sum, to determine a common local trained function for the client system and then encode the common local parameters in the local encrypted dataset.

The communication unit can store a data source identifier for the data source providing the respective training dataset and/or an identification information identifying the respective training dataset and/or the personal information for the person associated with the respective training dataset as part of a reidentification information retained in the client system, wherein a reference key for recovering the data source identifier and/or the identification information and/or the personal information for the training datasets used to train a respective local trained function is included in the respective plaintext dataset.

The respective reference key can be provided to the calculating unit or units that use the respective training dataset and can then be included in the local encrypted dataset by the respective calculating unit. Alternatively, the calculating unit can provide a list of used training datasets or some other way to identify used training datasets or persons associated with these training datasets to the communication unit and the communication unit can then include the relevant reference keys into the local encrypted dataset.

The reidentification information can be stored in an encrypted format, especially using the encryption key.

Besides the discussed computer-implemented method for providing a global encrypted dataset, one or more example embodiments of the present invention also concern a computer-implemented method for recovering personal information for a person associated with a training dataset used to train a trained function, wherein the trained function is based on a global encrypted dataset generated using the inventive method, wherein recovering the personal information comprises decrypting at least one of the local encrypted datasets used to generate the global encrypted dataset and/or the global encrypted dataset. As discussed above, personal information concerning statistics, e.g., the number of persons having a specific property whose training data was considered, can be recovered directly from the global encrypted dataset. Individual personal information, e.g., the age or weight of a person or information identifying a hospital record or some other source of further information can be recovered by decoding individual local encrypted datasets.

The trained function can be based on a global encrypted dataset generated using the computer-implemented method according to the present invention, wherein reidentification information is retained in the client system and a reference key is included in the respective plaintext dataset as discussed above, wherein at least reference key is recovered by decrypting at least one of the local encrypted datasets used to generate the global encrypted dataset, wherein the client system provides at least some of the personal information associated with that reference key in the reidentification information and/or wherein the communication unit uses the reference key to determine the data source identifier and/or the identification information from the reidentification information and to query the personal information from the data source identified by the source identifier using the identification information.

To recover the information, the reference key can be sent to all client systems and the respective reference key can be generated in such a way that the reference key clearly identifies the client system storing the associated reidentification information. Requests comprising a reference key that does not fit the respective client system can then be discarded by client systems. Alternatively, the reference key can only be sent to the client system associated with the decrypted local encrypted dataset. In a further alternative, the reference key can be generated locally, e.g., when a request queries personal information for all training datasets associated with a person with specific properties.

A request for querying personal information can be sent to the communication unit of the respective client system. The communication unit can therefore preferably receive requests for data, that can trigger an automatic aggregation of relevant data from multiple data source and especially an automatic training as discussed above, and a request for personal information, especially as an audit request. Audit requests can, e.g., be generated using a specific web interface. The reply to requests can be encrypted, e.g., using the encryption key. Therefore, it is, e.g., possible that an auditor sends a specific requested and the data recovered by this request does still need the decryption key from the key holder to allow for access to the personal information.

The communication unit can only provide personal information to other units within the same client system. Alternatively, a first type and a second type of personal information can be stored for at least some of the training datasets, wherein personal information of the first type is only provided to units within the same client system. All personal information accessible via the reidentification information can therefore only be available in the local network or some of this information can be available for outside requests, especially only information that does not allow a unique identification of a person and/or that does not comprise medical health data. Such information can, e.g., only be access within the client system, e.g., within the closed network of a certain hospital. If it should be necessary to access this information, an auditor or another interested party therefore needs the permission to access this data from inside the client system or the data access needs to be provided by authorized personal associated with this client system.

One or more example embodiments of the present invention also concern a computer system designed to perform the function of the client system and/or the aggregating system in at least one of the computer-implemented methods according to the present invention.

One or more example embodiments of the present invention also concern a computer program comprising instructions to cause a computer system to execute the steps of at least one of the computer-implemented methods according to the present invention implemented on the client system and/or the aggregating system.

One or more example embodiments of the present invention also concern a computer-readable storage medium having stored thereon the computer program according to the present invention.

BRIEF DESCRIPTION OF THE DRAWINGS

Other objects and features of the present invention will become apparent from the following detailed description considered in conjunction with the accompanying drawings. The drawings, however, are only principle sketches designed solely for the purpose of illustration and do not limit the present invention. The drawings show.

DETAILED DESCRIPTION

Figure 1:
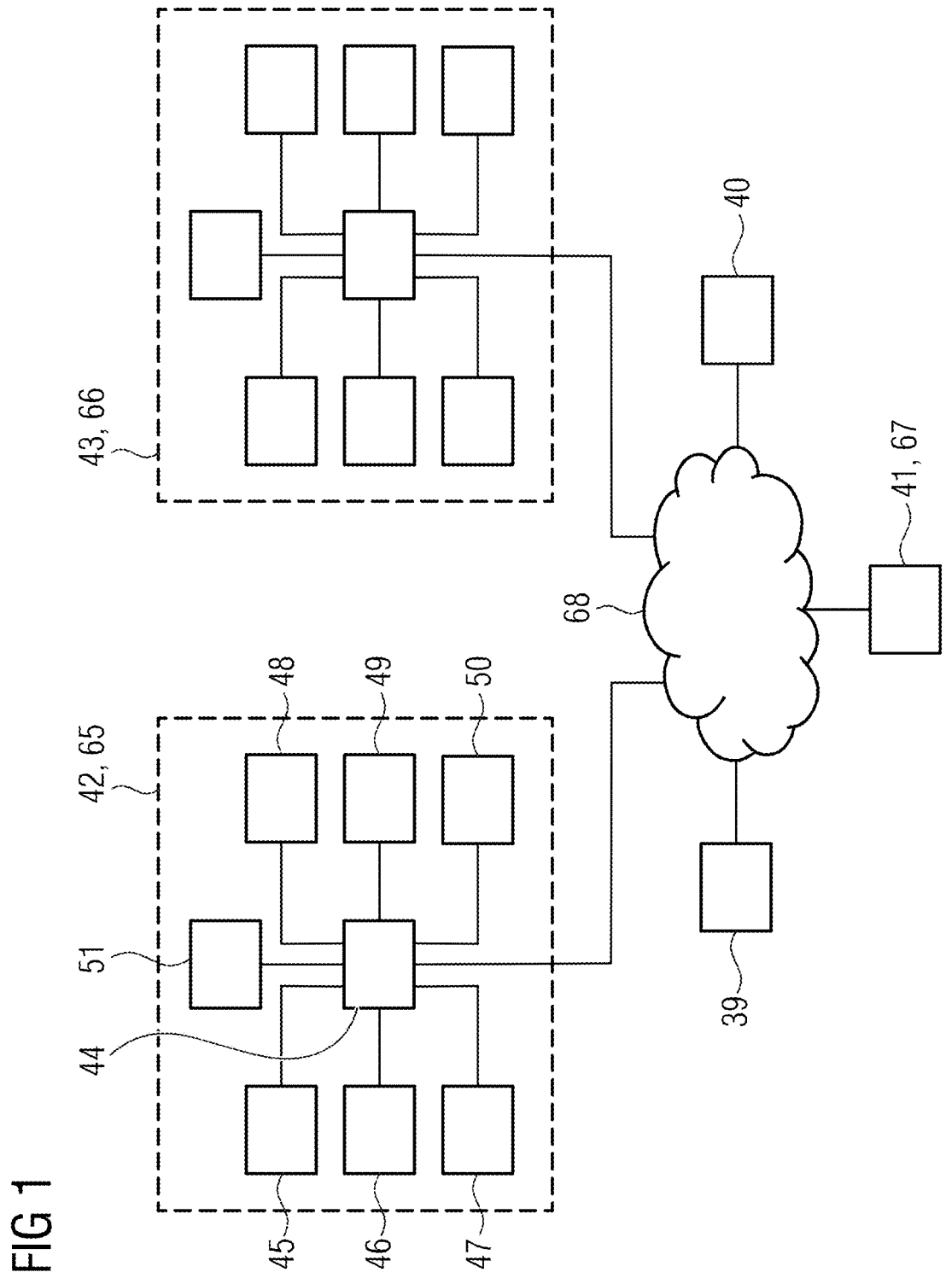
FIG. 1 exemplary embodiments of computer systems according to the present invention, that implement a respective embodiment of the computer implemented methods for providing a global encrypted dataset and for recovering personal information according to the present invention, FIG. 2 a flowchart of an exemplary embodiment of the computer implemented method for providing a global encrypted dataset according to the present invention, FIG. 3 preliminary steps to setup the computer implemented method discussed with reference to FIG. 2, FIG. 4 a flowchart of an exemplary embodiment of the computer implemented method for recovering personal information according to the present invention, FIG. 5 an example of a neural network that can be trained as the trained function in the computer implemented method discussed with reference to FIG. 2, and FIG. 6 an example of a convolutional neural network that can be trained as the trained function in the computer implemented method discussed with reference to FIG. 2.

FIG. 1 shows multiple computer systems 39, 40, 65, 66, 67 connected via a network 68, that can be a public network, e.g., the internet, wherein the computer system 65, 66, 67 implement a method for providing a global encrypted dataset that can be decrypted using a given decryption information to provide global parameters for parametrizing a base function to provide a global trained function trained by machine learning. In more general terms, a federated learning of the trained function is performed.

The method for providing the global encrypted dataset 62 will be discussed in detail with reference to FIG. 2. Since it can be advantageous to perform preparatory steps, that will later be discussed with reference to FIG. 3, before the steps shown in FIG. 2, the numbering of the steps in FIG. 2 starts with step S6.

Figure 2:
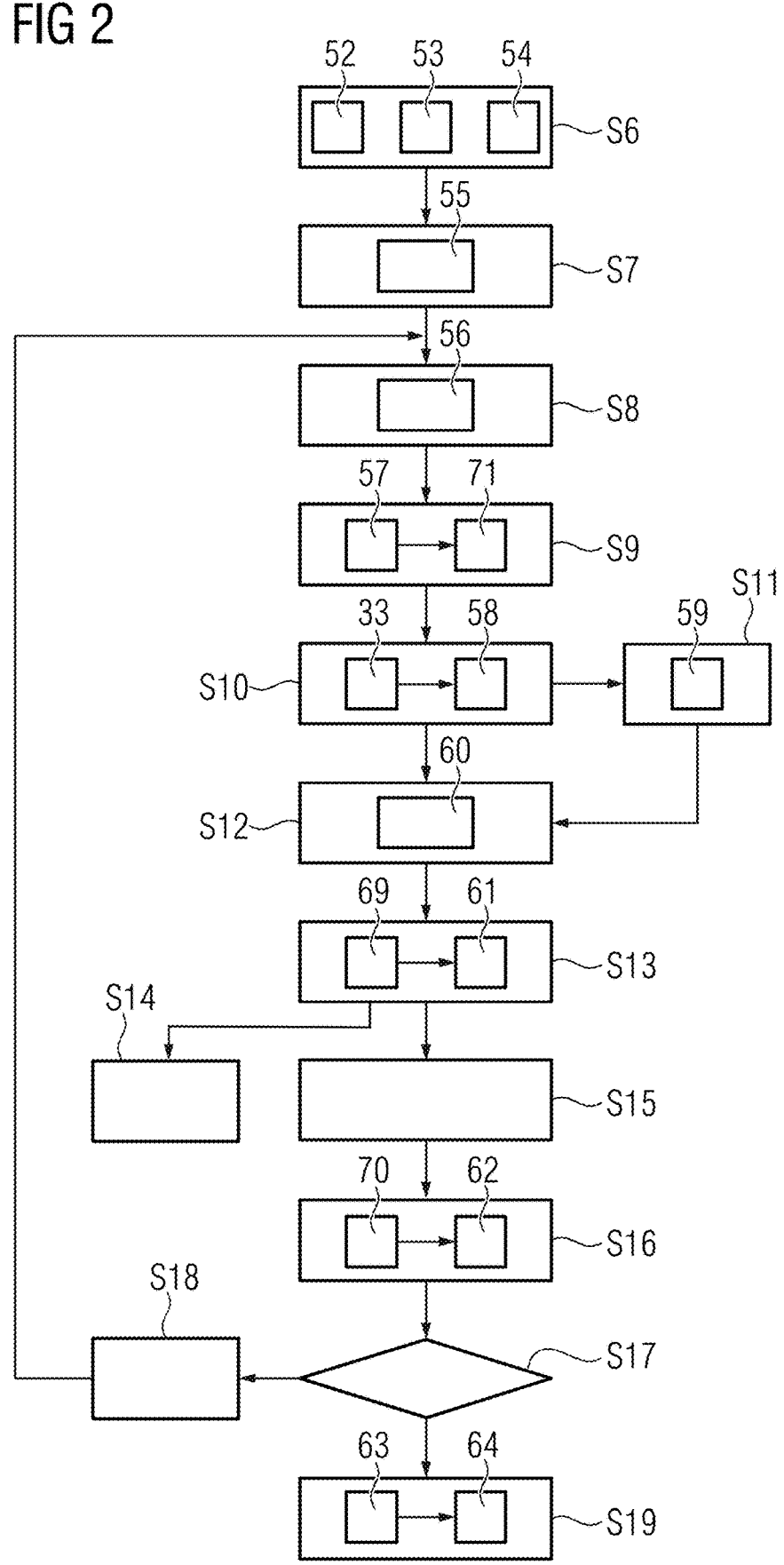
Figure 3:
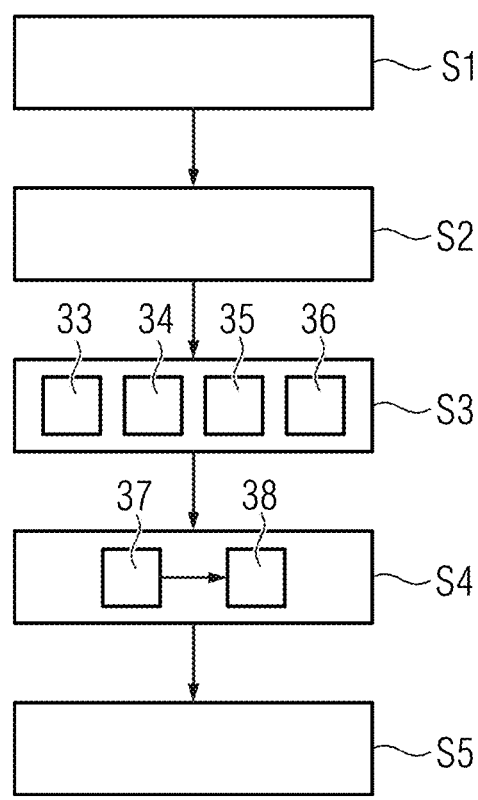

The flowchart in FIG. 2 concerns an example of a training method that incorporates multiple additional advantageous features, especially for handling personal information of persons associated with training datasets during the training. For a better understanding of the core principle of the discussed method, a couple of especially relevant steps will first be highlighted before discussing the full method in detail.

Like in usual federated learning approaches, a respective local trained function 71 is trained using multiple training datasets 33 that are specific to the respective client system 42, 43 performing the training to determine or update local parameters 58 for the local trained function 71.

In the example shown in FIG. 1, each of the client systems 42, 43 has multiple calculating units 48, 49, 50 within its closed network. In this case each of the calculating units 48, 49, 50 can perform a separate training of a respective local trained function 71. The calculating units 48, 49, 50 can use a shared pool of training datasets 33 or different subsets of this pool can be used for each of the calculating units 48, 49, 50, e.g. a separate minibatch for each of the calculating units 48, 49, 50. Training can be performed in the usual way, e.g. by calculating a gradient based on the training datasets 33 and adjusting the local parameters 58 along the gradient, wherein the strength of the adjustment depends on a learning rate that can be chosen in conjunction with the design of the base function 52 that is parametrized by the local parameters 58 to provide the local trained function 71.

The local parameters 58 or more specifically a plaintext dataset 60 comprising these parameters are then encrypted using an encryption algorithm 69 and an encryption key 53. The resulting local encrypted datasets 61 are then transmitted from the respective client system 42, 43 to an aggregating system 41 over the network 68.

On the aggregating system 41 a calculation algorithm 70 is used to calculate a global encrypted dataset 62. In the example the calculation algorithm 70 calculates a weighted sum of data entries of the local encrypted datasets 61, wherein each local encrypted dataset 61 is considered to be a vector. The used encryption algorithm 69 is homomorphic with respect to scalar multiplications and additions of vectors. Therefore, the vector of the global parameters 63 that can be recovered from the global encrypted dataset 62 by decrypting it with the decryption key 54 is equal to the weighted sum defined by the calculation algorithm 70 of the vectors given by a respective plaintext dataset for the respective client system 42, 43.

In other words, the functionality of providing a global training by calculating a weighted average of parameters determined during local training is provided by the method. Since the aggregating system 41 does not need the encryption key 53 or the decryption key 54 for its operation, the parameters of the trained function and any information concerning the persons whose training data was used to train the local trained function 71 cannot be accessed by the operator of the aggregating system 41 and are only available to the owner of the decryption key 54. Therefore, personal information and business secrets are robustly protected, even when the aggregation of the learning results is performed by a third party.

The details of the example shown in FIG. 2 will now be discussed in detail. In step S6 a base function 52 and the encryption and decryption key 53, 54 are provided. These pieces of information can, e.g., be provided by a customer that sponsors the training of the trained function. The encryption key 53, the decryption 54, if it is different from the encryption key 53, and the base function can be supplied to each of the client units 42, 43. This can, e.g., be achieved by using a third party computer system 39 that communicates e.g. via a virtual private network over the open network 68 with the respective client unit 42, 43, by providing this data from an access point 51 within the respective closed network of the respective client unit 42, 43 or by any other secure mechanism and/or means.

In step S7 initial global parameters 55 for parametrizing the base function 52 are determined. The initial global parameters 55 can essentially be random, it is however also possible to provide an advantageous starting point for the training by providing appropriate initial global parameters 55 that could, e.g., be determined during an initial training with a relatively small group of training datasets.

In step S8 the initial global parameters 55 are encrypted to provide an initial global encrypted dataset 56. Encryption is performed using the previously discussed encryption algorithm 69 and the encryption key 53. The initial global parameters 55 and additional entries for padding, that are later used to store personal information, can be considered to be a vector and encrypted as discussed above.

In step S9 the initial global encrypted dataset 55 is transmitted to the different client units 42, 43 and decrypted there, using the decryption key 54 to provide initial values 57 for an initial parametrization of the local trained function 65 prior to the local training. When multiple calculating units 48, 49, 55 are used in at least some of the client systems 42, 43, as shown in FIG. 1, a communication unit 44 of the respective client system 42, 43 can be used to distribute the information to the various calculating units 48, 49, 50. Potential implementations of the communication unit 44 will be discussed in more detail later.

In step S10 a training of the respective local trained function 71 is performed, e.g. by a gradient descent approach, using the training datasets 33 available for the respective client system 42, 43 or the respective calculating unit 48, 49, 50.

During the training, personal information 59 concerning the persons associated with the training datasets 33 used in the training of the respective local trained function 58 is also aggregated in step S11. The personal information 59 can directly describe certain properties of the respective person, e.g. a weight or an age. It is however also possible, that pseudonymized data is used that requires the use of a reidentification information 37, discussed later with reference to FIG. 3, to recover the original personal information.

It is e.g. possible to store a source identifier identifying the source 45, 46, 47 of the respective training dataset, e.g. a certain laboratory, certain medical imaging device or some other measuring equipment, and an examination number and then use the examination number to read out the relevant examination information comprising personal information concerning the person from the respective data source 45, 46, 47.

Additionally or alternatively, personal information can also be pseudonymized by a pseudonymization function, e.g. a hash function, wherein a stored reidentification information 37 allows the recovery of the original personal information via the pseudonymized personal information that serves as a reference key. Some of these approaches will later be described in more detail with reference to FIGS. 3 and 4.

In step S12 the local parameters 58 and the personal information 59 are aggregated into a plaintext dataset 60 in the respective client unit 42, 43. The plaintext dataset 60 can be considered to be a vector, wherein, e.g., the first entries can store the local parameters 58 and the following entries can store personal information. It is, e.g., possible to store a certain number of items of personal information for each of the training datasets and sequentially store these blocks of personal information for each of the training datasets in the vector defined by the plaintext dataset 60.

In step S13 the plaintext dataset 60 is encrypted using the homomorphic encryption algorithm 69 and the encryption key 53 as previously discussed.

In step S14 the encrypted local dataset 61 is stored in the respect client unit 42, 43 and/or on some other systems to allow a later recovery of personal information stored therein by using the decryption key 54.

In step S15 the respective local encrypted dataset 61 is transmitted to the aggregation system 41.

In step S16 the calculation algorithm 70 is used to calculate the global encrypted dataset 62 from the individual local encrypted datasets 61, as previously discussed.

In step S17 it is checked, if the required numbers of rounds of training were already performed. If this was not the case, the newly generated global encrypted dataset 62 is transmitted from the aggregating system 41 to the different client systems 42, 43 in step S18 and then locally decrypted to provide initial values to initially parametrize the local trained function 65 for the next round of training, as previously discussed with reference to the steps S8 and S9 with reference to the initial global encrypted dataset.

Once the training is finished, the global encrypted dataset 62 can be provided to a system of the sponsor of the machine learning, e.g. to the computer system 39, and decrypted in Step S19 using the decryption key 54 to provide the final global parameters 63 and therefore the final global trained function 64.

As previously discussed, the result of the decryption of the global encrypted dataset 62 will be the weighted sum of the local encrypted datasets 61. Part of the decrypted dataset will therefore provide the global parameters 63, while the remaining decrypted dataset will be a weighted sum of entries of the original plaintext datasets 60 concerning personal information. When a sufficient number of local encrypted datasets are used, the calculation of this weighted sum will typically render the stored personal information unusable. Data entries of the decrypted dataset can, e.g., be the weighted sum of hundreds of letters from names of persons or similar information that does not allow a recovery of personal information. Therefore, the personal information is strongly protected, since it is necessary to have access to both the decryption key and the individual local encrypted datasets. The only system requiring knowledge of the individual local encrypted datasets 61 and the decryption key 54 can be the respective client system 42, 43 that originally provided this local encrypted dataset 61, e.g., a protected system within a hospital.

As already discussed in detail in the general part of the description, it is however possible to allow for a recovery of statistical data, e.g., of the fraction of persons for whom training datasets were used during the training within a certain age-bracket, from the global encrypted dataset.

As previously discussed, the different client systems 42, 43 can have multiple data sources 45, 46, 47 and/or multiple calculating units 48, 49, 50. When a certain function is to be trained, it is therefore advantageous, if relevant training datasets are automatically collected from the multiple data sources 45, 46, 47 and distributed to the calculating units 48, 49, 50. This can e.g. be achieved by using preparatory steps shown in FIG. 3 that can be performed prior to the steps shown in FIG. 2.

In step S1 a training request is sent by a sponsor, e.g., from its own computer system 39 via a virtual private network through the public network 68 or via some other mechanism and/or means, to the different client units 42, 43. The training request especially comprises information, what kind of training datasets are to be used, e.g., specifying one or multiple age groups and/or the presence or absence of certain medical conditions. The request can also limit the training datasets to certain types of datasets, e.g., to certain types of medical images, can specify additional information to collect, e.g., from patient records, blood samples, etc. and so on. The request can also send via the aggregating system 41. In this case the request is preferably encoded in such a way that the operator of the aggregating data can not access the request information, e.g., by using the pre-arranged encryption key 53.

The communication unit 44 of the respective client systems 42, 43 then forwards the request to all or all relevant data sources 45, 46, 47 within the same client system 42, 43. Training datasets and/or partial information for training datasets is then selected in the various data sources based on the forwarded selection criterium and responses are collected in the communication unit 44 in step S3.

A possible implementation of the communication unit 44 implements a task scheduler to perform requested tasks. For the communication unit 44 shown in FIG. 1 only two tasks will be discussed, namely the data query and learning task that is discussed with reference to FIG. 3 and a recovery of personal data that can especially be necessary when an audit request is received and that will later be discussed with reference to FIG. 4.

The sending of requests to the individual data sources can be performed by a demultiplexer that sends data from a single initial request to all relevant data sources and therefore "fans out" the request. A "fan-in" can be performed by a multiplexer that receives data from the different data sources and aggregates data from different data sources into relevant training datasets.

Depending on the type of query, data sent from the individual data sources can be anonymized or pseudonymized prior to the multiplexing or in more general terms prior to the data aggregation.

The multiplexer and demultiplexer as well as the tasks scheduler can be implemented in hardware and/or software. The communication unit 44 can be approximated as a state machine that switches between different states of the multiplexer, the demultiplexer and the anonymization units depending on the received request.

The data aggregated in the communication unit 44 for each training dataset 33 in step S3 can also include a source identifier 34 that identifies the data source 45, 46, 47 providing the respective training dataset or parts of the respective training dataset, an identification information 35 for identifying the respective training dataset, e.g., an examination number, and/or personal information 36 for the person associated with the respective training dataset. In principle any or all of these data could be included as personal information 59 in the plaintext datasets 60, since the encryption of the plaintext dataset 60 ensures a certain amount of protection of personal information.

At least some of this information can however be more robustly protected. This is achieved in the example in step S4, wherein at least some of the information recovered in step S3 is stored as reidentification information 37 that is retained in the respective client system 42, 43. A reference key 38 is provided to recover this information. It is, e.g., possible to calculate a cryptographic hash function on the stored information and to use the hash value as the reference key.

Using a local storage of the reidentification information 37 can further limit the access to personal information. Access to some of the personal information can, e.g., only be possible when data is access from a local access point 51 within the respective client system 42, 43 or when some other kind of authentication, e.g., a two-factor authorisation, is provided.

In step S5 the training datasets 33 and the accompanying source identifier and/or identification information and/or personal information and/or reference keys for recovering this information can be provided to the individual calculating units 48, 49, 50 to then perform the training as discussed with reference to FIG. 2.

When a pseudonymization is performed as discussed with reference to step S4, the personal information 59 and therefore the plaintext dataset 60 can, e.g., only comprise the reference key. Alternatively, a mixed approach can be used that stores the reference key and some less sensitive personal information in the respective plaintext datasets 60 and therefore in the local encrypted dataset 61.

Figure 4:
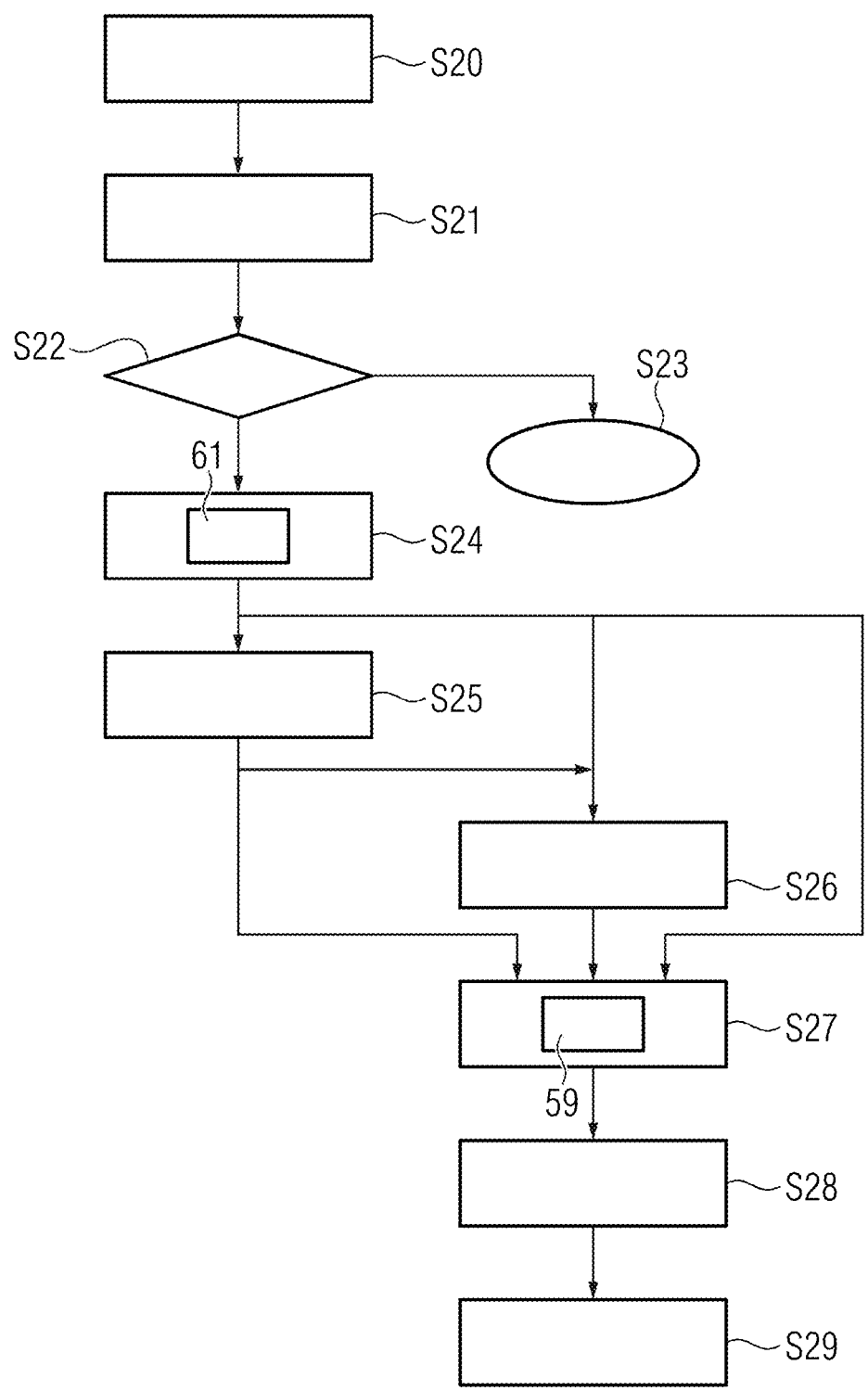

FIG. 4 shows a flowchart of an exemplary embodiment of a computer implemented method for recovering personal information 59 for a person associated with a training dataset 33 used to train a trained function with the previously discussed method. In the example an initial request is sent in step S20 from a system 40 shown in FIG. 1 that can be connected via the network 68 with the client unit 42, 43. Such a request can, e.g., be sent to audit a trained function or to, e.g., determine statistics concerning age groups, weight distributions etc. of involved persons. Authentication information for allowing such a request can, e.g., be generally provided to parties performing legit audits, e.g., government organizations. A list of relevant client systems and/or additional authorization information can be provided by the sponsor of the training of the trained function.

In step S21 the request is received by the communication unit 44 of the respective client system 42, 43 and in step S22 the authorization of the request is checked. If the request is non-authorized, the method ends in step S23, e.g., by reporting an error.

When the request is however authorized, the client system 42, 43 decrypts all local encrypted datasets 61 that were stored during the training of the respective function in step S14. Depending on the way that the personal information was stored in the local plaintext datasets 60 during the original training, different steps might be necessary to recover the respective piece of original personal information.

In the simplest case the decryption of the respective local encrypted dataset 61 directly yields the personal information 59 and the method can directly progress with a step S27 in which all relevant personal information 59 is collected for all relevant training datasets.

It is however also possible that the personal information 59 that is actually stored in the plaintext dataset 60 only comprises a data source identifier 34 that identifies the data source 45, 46 originally providing data for a respective training dataset and an identification information identifying the training dataset on the respective data source.

In this case the communication unit 44 can fan-out requests in a step S26 to the different data sources 45, 46, 47 to recover all relevant personal information 59 directly from the source. As previously discussed, the sending of requests to a source can be performed by a demultiplexer of the communication unit 44 and the aggregation of the data can be performed by a multiplexer.

For at least some of the personal information 59 it is possible that the personal information 59 or the source identifier and/or identification information are not directly stored in the plaintext dataset 60, but only stored after pseudonymization. In this case the decoding of the respective local encrypted dataset can provide the reference key that can be used to recover the original information from the reidentification information 37 as discussed above.

Depending on the recovered original information, the reidentification information 37 either directly provides the personal information 59 and the method can progress with step S27 or the data source identifier and identification information can be provided by the reidentification information 37, in which case the gathering of the information from the data sources 45, 46, 47 can additionally perform as discussed with respect to step S26.

It should be noted that different pieces of personal information 59 can be recovered using different branches of the approach discussed above, especially depending on the sensitivity of the respective personal information 59.

In step S28 a subset of the personal information determined in step S27 is selected. The selection process can, e.g., be useful to select random subsets or, e.g., subsets concerning certain age groups. It is also possible, to only provide specific pieces of personal information 59, e.g., only personal information that was explicitly requested.

It is also possible that some types of personal information 59 can only be accessed when the original request originated from within the respective client unit 42, 43, e.g., from the access point 51. This type of information can, e.g., not be provided as a reply to an external request. It is however possible, to provide a reference key to such an external request that can be used from a local access point 51 to access this data.

In step S29 the personal information 59 selected in step S28 is encrypted, e.g., using the encryption function 69 and the encryption key 53, and provided to the originator of the query, e.g., to the external system 40. When such an encryption is used, the data returned, e.g. for an auditor, can then be decrypted by original sponsor of the machine learning. This ensures that only legitimate audits can gain access to personal data relevant for an audit and that they can only read that data when the decryption is performed by the original sponsor of this training task or a trusted partner, e.g., a hospital running a client system, or when the decryption key is provided to the auditor. To access personal information outside of the respective client system 42, 43 it is therefore necessary to have auditing privileges and to have access to the decryption key, leading to a very robust protection of personal information.

In the following relatively simple examples of functions that can be trained by the discussed method will be discussed with reference to FIGS. 5 and 6.

Figure 5:
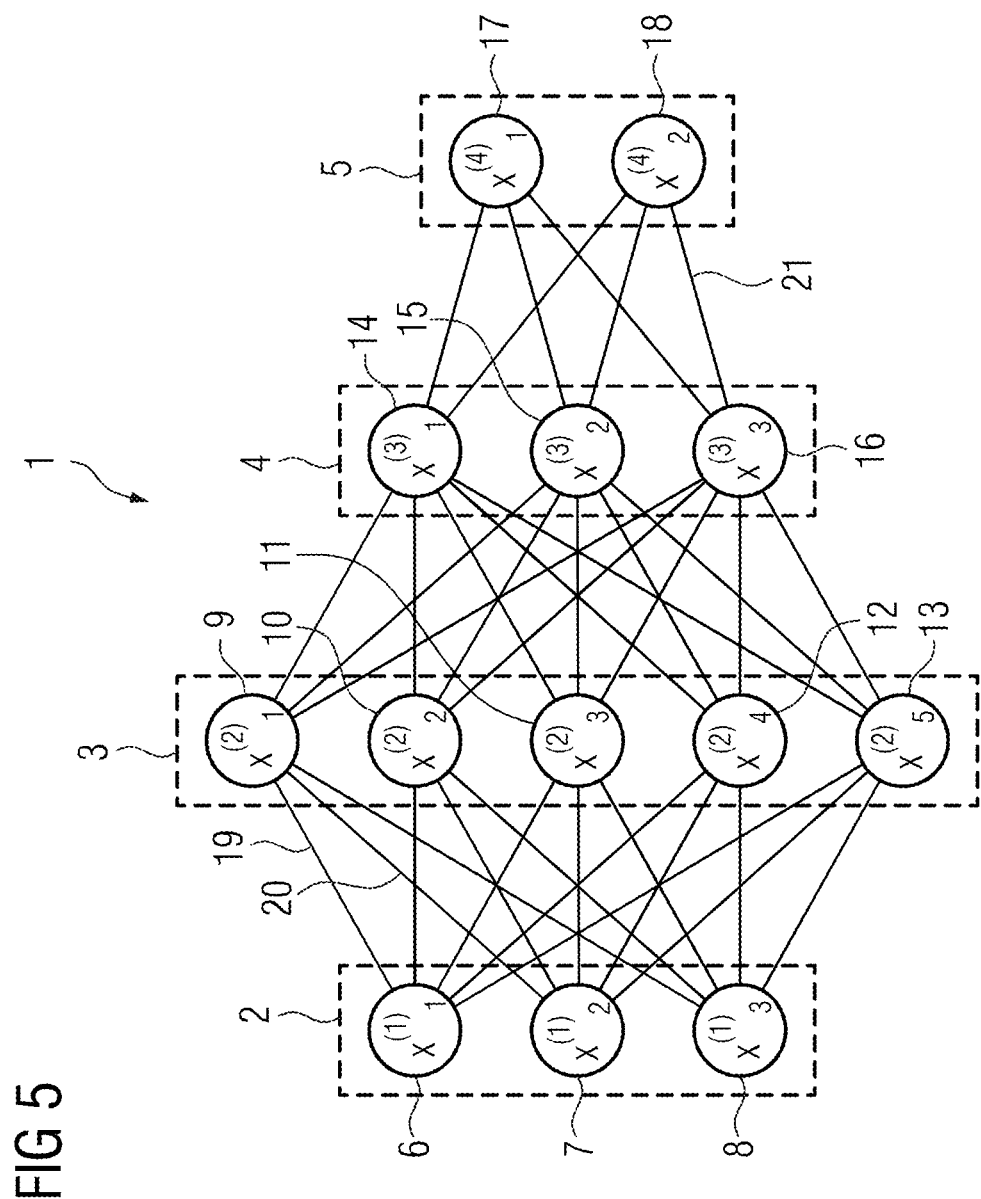

FIG. 5 displays an embodiment of an artificial neural network 1. Alternative terms for "artificial neural network" are "neural network", "artificial neural net" or "neural net".

The artificial neural network 1 comprises nodes 6-18 and edges 19-21, wherein each edge 19-21 is a directed connection from a first node 6-18 to a second node 6-18. In general, the first node 6-18 and the second node 6-18 are different nodes 6-18. It is also possible that the first node 6-18 and the second node 6-18 are identical. For example, in FIG. 5 the edge 19 is a directed connection from the node 6 to the node 9, and the edge 20 is a directed connection from the node 7 to the node 9. An edge 19-21 from a first node 6-18 to a second node 6-18 is also denoted as "ingoing edge" for the second node 6-18 and as "outgoing edge" for the first node 6-18.

In this embodiment, the nodes 6-18 of the artificial neural network 1 can be arranged in layers 2-5, wherein the layers 2-5 can comprise an intrinsic order introduced by the edges 19-21 between the nodes 6-18. In particular, edges 19-21 can exist only between neighboring layers of nodes 6-18. In the displayed embodiment, there is an input layer 2 comprising only nodes 6-8 without an incoming edge, an output layer 5 comprising only nodes 17, 18 without outgoing edges, and hidden layers 3, 4 in-between the input layer 2 and the output layer 5. In general, the number of hidden layers 3, 4 can be chosen arbitrarily. The number of nodes 6-8 within the input layer 2 usually relates to the number of input values of the neural network, and the number of nodes 17, 18 within the output layer 5 usually relates to the number of output values of the neural network.

In particular, a (real) number can be assigned as a value to every node 6-18 of the neural network 1. Here, x(n)i denotes the value of the i-th node 6-18 of the n-th layer 2-5. The values of the nodes 6-8 of the input layer 2 are equivalent to the input values of the neural network 1, the values of the nodes 17, 18 of the output layer 5 are equivalent to the output values of the neural network 1. Furthermore, each edge 19-21 can comprise a weight being a real number, in particular, the weight is a real number within the interval [−1, 1] or within the interval [0, 1]. Here, w(m,n)i,j denotes the weight of the edge between the i-th node 6-18 of the m-th layer 2-5 and the j-th node 6-18 of the n-th layer 2-5. Furthermore, the abbreviation w(n)i,j is defined for the weight w(n,n+1)i,j.

In particular, to calculate the output values of the neural network 1, the input values are propagated through the neural network 1. In particular, the values of the nodes 6-18 of the (n+1)-th layer 2-5 can be calculated based on the values of the nodes 6-18 of the n-th layer 2-5 by $$x_j^{(n+1)} = f(\Sigma_i x_i^{(n)} \cdot w_{i,j}^{(n)}).$$

Herein, the function f is a transfer function (another term is "activation function"). Known transfer functions are step functions, sigmoid function (e.g. the logistic function, the generalized logistic function, the hyperbolic tangent, the Arctangent function, the error function, the smoothstep function) or rectifier functions. The transfer function is mainly used for normalization purposes.

In particular, the values are propagated layer-wise through the neural network 1, wherein values of the input layer 2 are given by the input of the neural network 1, wherein values of the first hidden layer 3 can be calculated based on the values of the input layer 2 of the neural network 1, wherein values of the second hidden layer 4 can be calculated based in the values of the first hidden layer 3, etc.

In order to set the values w(m,n)i,j for the edges 19-21, the neural network 1 has to be trained using training data. In particular, training data comprises training input data and training output data (denoted as ti). For a training step, the neural network 1 is applied to the training input data to generate calculated output data. In particular, the training data and the calculated output data comprise a number of values, said number being equal to the number of nodes 17, 18 of the output layer 5.

In particular, a comparison between the calculated output data and the training data is used to recursively adapt the weights within the neural network 1 (backpropagation algorithm). In particular, the weights are changed according to $$w'^{(n)}_{i,j} = w^{(n)}_{i,j} - \gamma \cdot \delta^{(n)}_j \cdot x^{(n)}_i$$

wherein γ is a learning rate, and the numbers δ(n)j can be recursively calculated as $$\delta^{(n)}_j = (\Sigma_k \delta^{(n+1)}_k \cdot w^{(n+1)}_{j,k}) \cdot f'(\Sigma_i x^{(n)}_i \cdot w^{(n)}_{i,j})$$

based on δ(n+1)j, if the (n+1)-th layer is not the output layer 5, and $$\delta^{(n)}_j = (x^{(n+1)}_k - t^{(n+1)}_j) \cdot f'(\Sigma_i x^{(n)}_i \cdot w^{(n)}_{i,j})$$

if the (n+1)-th layer is the output layer 5, wherein f' is the first derivative of the activation function, and y(n+1)j is the comparison training value for the j-th node of the output layer 5.

Figure 6:
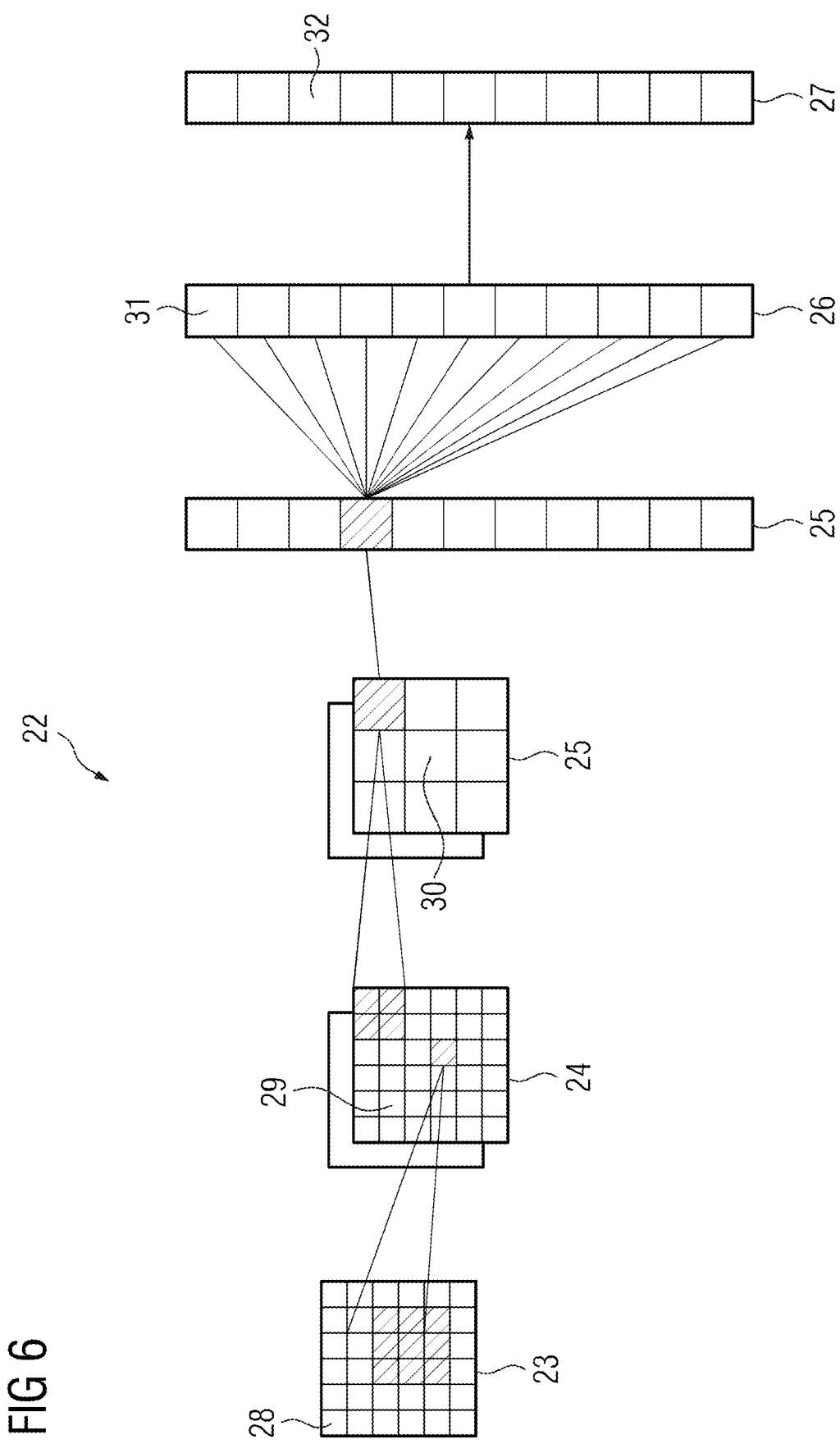

FIG. 6 displays an embodiment of a convolutional neural network 22. In the displayed embodiment, the convolutional neural network 22 comprises an input layer 23, a convolutional layer 24, a pooling layer 25, a fully connected layer 26 and an output layer 27. Alternatively, the convolutional neural network 22 can comprise several convolutional layers 24, several pooling layers 25 and several fully connected layers 26 as well as other types of layers. The order of the layers can be chosen arbitrarily, usually fully connected layers 26 are used as the last layers before the output layer 27.

In particular, within a convolutional neural network 22 the nodes 28-32 of one layer 23-27 can be considered to be arranged as a d-dimensional matrix or as a d-dimensional image. In particular, in the two-dimensional case the value of the node 28-32 indexed with i and j in the n-th layer 23-27 can be denoted as x(n)[i,j]. However, the arrangement of the nodes 28-32 of one layer 23-27 does not have an effect on the calculations executed within the convolutional neural network 22 as such, since these are given solely by the structure and the weights of the edges.

In particular, a convolutional layer 24 is characterized by the structure and the weights of the incoming edges forming a convolution operation based on a certain number of kernels. In particular, the structure and the weights of the incoming edges are chosen such that the values x(n)k of the nodes 29 of the convolutional layer 24 are calculated as a convolution x(n)k=Kk*x(n−1) based on the values x(n−1) of the nodes 28 of the preceding layer 23, where the convolution * is defined in the two-dimensional case as $$x^{(n)}_k[i,j] = (K_k * x^{(n-1)})[i,j] = \Sigma_{i'}\Sigma_{j'} K_k[i',j'] \cdot x^{(n-1)}[i-i', j-j'].$$

Here the k-th kernel Kk is a d-dimensional matrix (in this embodiment a two-dimensional matrix), which is usually small compared to the number of nodes 28-32 (e.g. a 3×3 matrix, or a 5×5 matrix). In particular, this implies that the weights of the incoming edges are not independent, but chosen such that they produce said convolution equation. In particular, for a kernel being a 3×3 matrix, there are only 9 independent weights (each entry of the kernel matrix corresponding to one independent weight), irrespectively of the number of nodes 28-32 in the respective layer 23-27. In particular, for a convolutional layer 24 the number of nodes 29 in the convolutional layer is equivalent to the number of nodes 28 in the preceding layer 23 multiplied with the number of kernels.

If the nodes 28 of the preceding layer 23 are arranged as a d-dimensional matrix, using a plurality of kernels can be interpreted as adding a further dimension (denoted as "depth" dimension), so that the nodes 29 of the convolutional layer 24 are arranged as a (d+1)-dimensional matrix. If the nodes 28 of the preceding layer 23 are already arranged as a (d+1)-dimensional matrix comprising a depth dimension, using a plurality of kernels can be interpreted as expanding along the depth dimension, so that the nodes 29 of the convolutional layer 64 are arranged also as a (d+1)-dimensional matrix, wherein the size of the (d+1)-dimensional matrix with respect to the depth dimension is by a factor of the number of kernels larger than in the preceding layer 23.

The advantage of using convolutional layers 24 is that spatially local correlation of the input data can exploited by enforcing a local connectivity pattern between nodes of adjacent layers, in particular by each node being connected to only a small region of the nodes of the preceding layer.

In the displayed embodiment, the input layer 23 comprises 36 nodes 28, arranged as a two-dimensional 6×6 matrix. The convolutional layer 24 comprises 72 nodes 29, arranged as two two-dimensional 6×6 matrices, each of the two matrices being the result of a convolution of the values of the input layer 23 with a kernel. Equivalently, the nodes 29 of the convolutional layer 24 can be interpreted as arranged as a three-dimensional 6×6×2 matrix, wherein the last dimension is the depth dimension.

A pooling layer 25 can be characterized by the structure and the weights of the incoming edges and the activation function of its nodes 30 forming a pooling operation based on a non-linear pooling function f. For example, in the two-dimensional case the values x(n) of the nodes 30 of the pooling layer 25 can be calculated based on the values x(n−1) of the nodes 29 of the preceding layer 24 as $$x^{(n)}[i,j] = f(x^{(n-1)}[id_1, jd_2], \ldots, x^{(n-1)}[id_1+d_1-1, jd_2+d_2-1])$$

In other words, by using a pooling layer 25 the number of nodes 29, 30 can be reduced, by replacing a number d1·d2 of neighboring nodes 29 in the preceding layer 24 with a single node 30 being calculated as a function of the values of said number of neighboring nodes in the pooling layer 25. In particular, the pooling function f can be the max-function, the average or the L2-Norm. In particular, for a pooling layer 25 the weights of the incoming edges are fixed and are not modified by training.

The advantage of using a pooling layer 25 is that the number of nodes 29, 30 and the number of parameters is reduced. This leads to the amount of computation in the network 22 being reduced and to a control of overfitting.

In the displayed embodiment, the pooling layer 25 is a max-pooling, replacing four neighboring nodes with only one node, the value being the maximum of the values of the four neighboring nodes. The max-pooling is applied to each d-dimensional matrix of the previous layer 24; in this embodiment, the max-pooling is applied to each of the two two-dimensional matrices, reducing the number of nodes from 72 to 18.

A fully-connected layer 26 can be characterized by the fact that a majority, in particular, all edges between nodes 30 of the previous layer 25 and the nodes 31 of the fully-connected layer 26 are present, and wherein the weight of each of the edges can be adjusted individually.

In this embodiment, the nodes 30 of the preceding layer 25 of the fully-connected layer 26 are displayed both as two-dimensional matrices, and additionally as non-related nodes (indicated as a line of nodes, wherein the number of nodes was reduced for a better presentability). In this embodiment, the number of nodes 31 in the fully connected layer 26 is equal to the number of nodes 30 in the preceding layer 25. Alternatively, the number of nodes 30, 31 can differ.

Furthermore, in this embodiment the values of the nodes 32 of the output layer 27 are determined by applying the Softmax function onto the values of the nodes 31 of the preceding layer 26. By applying the Softmax function, the sum of the values of all nodes 32 of the output layer 27 is 1, and all values of all nodes 32 of the output layer 27 are real numbers between 0 and 1. In particular, if using the convolutional neural network 22 for categorizing input data, the values of the output layer can be interpreted as the probability of the input data falling into one of the different categories.

A convolutional neural network 22 can also comprise a ReLU (acronym for "rectified linear units") layer. In particular, the number of nodes and the structure of the nodes contained in a ReLU layer is equivalent to the number of nodes and the structure of the nodes contained in the preceding layer. In particular, the value of each node in the ReLU layer is calculated by applying a rectifying function to the value of the corresponding node of the preceding layer. Examples for rectifying functions are $f(x)=\max(0,x)$, the tangent hyperbolics function or the sigmoid function.

In particular, convolutional neural networks 22 can be trained based on the backpropagation algorithm. For preventing overfitting, methods of regularization can be used, e.g. dropout of nodes 28-32, stochastic pooling, use of artificial data, weight decay based on the L1 or the L2 norm, or max norm constraints.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, Cif, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the present invention has been described in detail with reference to the preferred embodiment, the present invention is not limited by the disclosed examples from which the skilled person is able to derive other variations without departing from the scope of the present invention.

What is claimed is:

1. A computer-implemented method for providing a global encrypted dataset, which is decryptable using a decryption key to provide global parameters parametrizing a base function to provide a global trained function trained by machine learning, the computer-implemented method comprising:
   determining respective local parameters parametrizing the base function to provide at least one local trained function for each of multiple client systems by training a respective local trained function using machine learning with multiple training datasets on a respective client system of the multiple client systems, wherein at least some of the multiple training datasets are specific to the respective client system;
   encrypting a respective local plaintext dataset including local parameters of the respective local trained function to generate a respective local encrypted dataset on the respective client system, the encrypting using an encryption key that allows for decryption of the respective local encrypted dataset using the decryption key and an encryption algorithm that is homomorphic with respect to a calculation algorithm;
   transmitting the respective local encrypted dataset to an aggregating system; and
   calculating, at the aggregating system, the global encrypted dataset from respective local encrypted datasets using the calculation algorithm, the calculating the global encrypted dataset being repeated for multiple rounds of machine learning, each round of the multiple rounds after a first round including transmitting the global encrypted dataset calculated by the aggregating system, in a previous round, to the multiple client systems, decrypting the global encrypted dataset, by the multiple client systems, to determine the global parameters for the previous round, and using the global parameters for the previous round as initial local parameters during the training of the respective local trained function.

2. The computer-implemented method according to claim 1, wherein each of the multiple training datasets includes at least one of measurement data or image data that concerns a person associated with a training dataset of the multiple training datasets and that is used in the training of the respective local trained function, wherein the respective local plaintext dataset includes personal information concerning persons associated with the multiple training datasets used to train the respective local trained function on the respective client system.

3. The computer-implemented method according to claim 2, wherein the personal information includes identifying information for each of the multiple training datasets, the identifying information, either by itself or in conjunction with separately stored reidentification information, allows for identification of a person associated with a respective training dataset.

4. The computer-implemented method according to claim 2, wherein the personal information includes respective property information for each of the multiple training datasets, wherein the respective property information concerns a property of a person associated with a respective training dataset.

5. The computer-implemented method according to claim 2, wherein the personal information includes statistical information concerning a number of persons having a respective property associated with the multiple training datasets used to train the respective local trained function on the respective client system.

6. The computer-implemented method according to claim 1, wherein the respective local encrypted dataset includes an ordered sequence of data elements, wherein for each respective position in the ordered sequence, a sum or weighted sum of the data elements of the respective local encrypted dataset having the respective position is calculated in the calculation algorithm.

7. The computer-implemented method according to claim 1, wherein at least one of the multiple client systems includes multiple data sources and a communication unit, wherein the communication unit receives a request message including a selection criterium for selecting the multiple training datasets for training the at least one local trained function, wherein the communication unit forwards the selection criterium to the multiple data sources, wherein the multiple data sources select datasets matching the selection criterium as training datasets and forward the training datasets to the communication unit.

8. The computer-implemented method according to claim 7, wherein the at least one of the multiple client systems includes multiple calculating units, wherein the communication unit forwards the training datasets or a respective subgroup of the training datasets provided by the data sources to the multiple calculating units, wherein each respective calculating unit performs a training of a respective local trained function based on forwarded training datasets.

9. The computer-implemented method according to claim 7, wherein
the communication unit stores, as part of a reidentification information retained in the at least one of the multiple client systems, at least one of a data source identifier for a data source of the multiple data sources providing a respective training dataset, identification information identifying the respective training dataset, or personal information for a person associated with the respective training dataset, and
a reference key for recovering the at least one of the data source identifier, the identification information or the personal information for training datasets used to train the respective local trained function is included in the respective local plaintext dataset.

10. The computer-implemented method according to claim 1, further comprising:
training a trained function based on the global encrypted dataset; and
decrypting at least one of the global encrypted dataset or the respective local encrypted datasets used to generate the global encrypted dataset to recover personal information for a person associated with a training dataset of the multiple training datasets used to train the trained function.

11. The computer-implemented method according to claim 9, wherein
the reference key is recovered by decrypting at least one of the respective local encrypted datasets used to generate the global encrypted dataset, and at least one of the respective client system provides at least some of the personal information associated with the reference key in the reidentification information, or the communication unit uses the reference key to determine at least one of the data source identifier or the identification information from the reidentification information and to query the personal information from the data source identified by the data source identifier using the identification information.

12. The computer-implemented method according to claim 10, wherein a communication unit only provides personal information to other units within a same client system or wherein a first type and a second type of personal information is stored for at least some of the multiple training datasets, wherein personal information of the first type is only provided to units within the same client system.

13. The computer-implemented method according to claim 3, wherein the personal information includes respective property information for each of the multiple training datasets, wherein the respective property information concerns a property of the person associated with the training dataset.

14. The computer-implemented method according to claim 13, wherein the personal information includes statistical information concerning a number of persons having a respective property associated with the multiple training datasets used to train the respective local trained function on the respective client system.

15. A non-transitory computer-readable storage medium storing computer-executable instructions that, when executed at a computer system, cause the computer system to execute a computer-implemented method for providing a global encrypted dataset, which is decryptable using a decryption key to provide global parameters parametrizing a base function to provide a global trained function trained by machine learning, the computer-implemented method comprising:
determining respective local parameters parametrizing the base function to provide at least one local trained function for each of multiple client systems by training a respective local trained function using machine learning with multiple training datasets on a respective client system of the multiple client systems, wherein at least some of the multiple training datasets are specific to the respective client system;
encrypting a respective local plaintext dataset including local parameters of the respective local trained function to generate a respective local encrypted dataset on the respective client system, the encrypting using an encryption key that allows for decryption of the respective local encrypted dataset using the decryption key and an encryption algorithm that is homomorphic with respect to a calculation algorithm;
transmitting the respective local encrypted dataset to an aggregating system; and
calculating, at the aggregating system, the global encrypted dataset from respective local encrypted datasets using the calculation algorithm, the calculating the global encrypted dataset being repeated for multiple rounds of machine learning, each round of the multiple rounds after a first round including transmitting the global encrypted dataset calculated by the aggregating system, in a previous round, to the multiple client systems, decrypting the global encrypted dataset, by the multiple client systems, to determine the global parameters for the previous round, and using the global parameters for the previous round as initial local parameters during the training of the respective local trained function.

16. A computer-implemented method for providing a global encrypted dataset, which is decryptable using a decryption key to provide global parameters parametrizing a base function to provide a global trained function trained by machine learning, the computer-implemented method comprising:
    determining respective local parameters parametrizing the base function to provide at least one local trained function for each of multiple client systems by training a respective local trained function using machine learning with multiple training datasets on a respective client system, wherein at least some of the multiple training datasets are specific to the respective client system;
    encrypting a respective local plaintext dataset including local parameters of the respective local trained function to generate a respective local encrypted dataset on the respective client system, the encrypting using an encryption key that allows for decryption of the respective local encrypted dataset using the decryption key and an encryption algorithm that is homomorphic with respect to a calculation algorithm;
    transmitting the respective local encrypted dataset to an aggregating system; and
    calculating, at the aggregating system, the global encrypted dataset from respective local encrypted datasets using the calculation algorithm;
    wherein at least one of the multiple client systems includes multiple data sources and a communication unit;
    wherein the communication unit receives a request message including a selection criterium for selecting the multiple training datasets for training the at least one local trained function;
    wherein the communication unit forwards the selection criterium to the multiple data sources;
    wherein the multiple data sources select datasets matching the selection criterium as training datasets and forward the training datasets to the communication unit;
    wherein the communication unit stores, as part of a reidentification information retained in the at least one of the multiple client systems, at least one of a data source identifier for the data source providing a respective training dataset, identification information identifying the respective training dataset, or personal information for a person associated with the respective training dataset; and
    wherein a reference key for recovering the at least one of the data source identifier, the identification information, or the personal information for training datasets used to train the respective local trained function is included in the respective local plaintext dataset.

17. The computer-implemented method according to claim 16, wherein each of the multiple training datasets includes at least one of measurement data or image data that concerns a person associated with a training dataset of the multiple training datasets and that is used in the training of the respective local trained function, wherein the respective local plaintext dataset includes personal information concerning persons associated with the multiple training datasets used to train the respective local trained function on the respective client system.

18. The computer-implemented method according to claim 17, wherein the personal information includes at least one of identifying information for each of the multiple training datasets, respective property information for each of the multiple training datasets or statistical information concerning a number of persons having a respective property associated with the multiple training datasets used to train the respective local trained function on the respective client system, the identifying information, either by itself or in conjunction with separately stored reidentification information, allows for identification of a person associated with a respective training dataset, and the respective property information concerns a property of a person associated with a respective training dataset.

19. The computer-implemented method according to claim 16, wherein the calculating of the global encrypted dataset is repeated for multiple rounds of machine learning, wherein each of the multiple rounds, except for a first of the multiple rounds, additionally comprises:
    transmitting the global encrypted dataset calculated by the aggregating system, in a previous round, to the multiple client systems;
    decrypting the global encrypted dataset, by the multiple client systems, to determine the global parameters for the previous round; and
    using the global parameters for the previous round as initial local parameters during the training of the respective local trained function.

20. The computer-implemented method according to claim 16, wherein the respective local encrypted dataset includes an ordered sequence of data elements, wherein for each respective position in the ordered sequence, a sum or weighted sum of the data elements of the respective local encrypted dataset having the respective position is calculated in the calculation algorithm.

21. The computer-implemented method according to claim 16, wherein the at least one of the multiple client systems includes multiple calculating units, wherein the communication unit forwards the training datasets or a respective subgroup of the training datasets provided by the data sources to the multiple calculating units, wherein each respective calculating unit performs a training of a respective local trained function based on forwarded training datasets.

22. The computer-implemented method according to claim 16, wherein
    the reference key is recovered by decrypting at least one of the respective local encrypted datasets used to generate the global encrypted dataset, and
    at least one of the respective client system provides at least some of the personal information associated with the reference key in the reidentification information, or the communication unit uses the reference key to determine at least one of the data source identifier or the identification information from the reidentification information and to query the personal information from a data source of the multiple data sources identified by the data source identifier using the identification information.

* * * * *